(12) United States Patent
C V et al.

(10) Patent No.: US 8,705,601 B2
(45) Date of Patent: *Apr. 22, 2014

(54) APPARATUS AND METHOD FOR VARYING INTER SYMBOL INTERFERENCE AND BANDWIDTH EXTENSION PRE-EMPHASIS ON A HIGH SPEED DIGITAL SIGNAL

(75) Inventors: Ramachandra C V, Bangalore (IN); Shikha Ramachandra, Urbana, IL (US)

(73) Assignee: Tektronix, Inc., Beaverton, OR (US)

( * ) Notice: Subject to any disclaimer, the term of this patent is extended or adjusted under 35 U.S.C. 154(b) by 503 days.

This patent is subject to a terminal disclaimer.

(21) Appl. No.: 12/882,048

(22) Filed: Sep. 14, 2010

(65) Prior Publication Data

US 2012/0051414 A1 Mar. 1, 2012

(30) Foreign Application Priority Data

Aug. 30, 2010 (IN) .......................... 2410/MUM/2010

(51) Int. Cl.
*H04B 17/00* (2006.01)
(52) U.S. Cl.
USPC ............ 375/228; 375/225; 375/226; 375/227

(58) Field of Classification Search
USPC .................................................. 375/228, 227
See application file for complete search history.

(56) References Cited

U.S. PATENT DOCUMENTS

2009/0195498 A1 8/2009 Desai
2009/0195525 A1 8/2009 Desai

*Primary Examiner* — Qutbuddin Ghulamali
(74) *Attorney, Agent, or Firm* — Michael A. Nelson; Marger, Johnson & McCollom, P.C.

(57) ABSTRACT

A signal generating device has a display, central processing unit and a waveform generating circuit. The central processing unit generates a user interface on the display for setting parameters for a serial data pattern and a parameter for an intersymbol interference and a bandwidth extension pre-emphasis effect on the serial data pattern. A waveform record file is generated using the serial data pattern parameters and the intersymbol interference effect and bandwidth extension pre-emphasis effect parameter. A waveform generation circuit receives the waveform record file and generates a serial data pattern analog output signal having the intersymbol interference effect or the bandwidth extension pre-emphasis effects defined by the intersymbol interference and bandwidth extension pre-emphasis effect parameter.

15 Claims, 12 Drawing Sheets

APPARATUS AND METHOD FOR VARYING INTER SYMBOL INTERFERENCE AND BANDWIDTH EXTENSION PRE-EMPHASIS ON A HIGH SPEED DIGITAL SIGNAL

CROSS REFERENCE TO RELATED APPLICATIONS

This application claims priority to IN/2410/MUM/2010, filed Aug. 30, 2010, herein incorporated by reference.

BACKGROUND OF THE INVENTION

In high speed serial data communication systems, Inter Symbol interference (ISI) is a form of distortion of a signal in which one symbol interferes with subsequent symbols. This is an unwanted phenomenon because the inter symbol interference generates an effect similar to noise, thereby increasing the Bit Error Rate of the system.

A signal sent from a gigabit per second transmitter on the I/O pin of one chip travels first along a trace on a plug-in card, through cables and then across a backplane to another plug-in card that contains the receiving chip. The signal often becomes degraded by random and periodic jitter, duty cycle distortion, inter symbol interference, frequency-selective attenuation, crosstalk, and the like. The ISI impairment is caused by reflections, typically caused in turn by impedance mismatch at various interconnection discontinuities.

Today, data rates are usually well above 1 Gb/s, so an echo decay time is longer than the pulse spacing, and the received pulse is mixed up with echoes of the previous pulse. There is a need to mitigate these impairments. Design of adequate mitigating algorithms, such as a pre-emphasis filter for the transmitter and a decision feedback equalizer (DFE) for the receiver, requires an accurate model of the impairment.

The impairments are modeled with the help of S-Parameter Touchstone files of the cables, interconnects and backplane to measure the BER tolerance of their receivers. This test is called receiver margin testing.

Signal integrity engineers carry out jitter tolerance/margin testing on digital receivers of high speed serial standards, such as HDMI, Display Port, SATA, PCI-E and the like. The jitter tolerance/receiver margin testing requires signals to be generated with various amounts of random and periodic jitter, duty cycle distortion and inter symbol interference. Some high speed serial standards recommend hardware cable emulators for emulating ISI effects. In the case of the HDMI (High Definition Multimedia Interface) standard, the recommended hardware cable emulators are produced by Agilent Technologies, Santa Clara, Calif., which produce fixed amounts of ISI. These cable emulators have a typical copper attenuation. The operational bandwidths of these cable emulators are restricted due to hardware constraints. For different pixel clock rates of HDMI, different hardware emulators are used for jitter tolerance tests. This process of using hardware cable emulators restricts the test conditions required for testing receiver performance. The amount of ISI on a signal at a particular data rate is limited.

FIG. 1 shows a representative test setup 10 for HDMI compliance testing of a device under test (DUT) 12. An arbitrary waveform generator 14, such as an AWG710, manufactured and sold by Tektronix, Inc., Beaverton, Oreg., generates and outputs differential clock signals, CL and $\overline{CL}$, that are coupled to bias-tees 16. The bias-tees 16 are required to bring the differential clock signals, CL and $\overline{CL}$, to the required TMDS (Transitioned-Minimized Differential Signaling) levels. The output differential clock signals, CL and $\overline{CL}$, from the bias-tees 16 are coupled to an adapter board 18, such as a ET-HDMIC-TPA-R Receptacle Board, manufactured and sold by Efficere Technologies, Washougal, Wash., via Transition Time Converter (TTC) modules 20. The TTC modules 20 slow the rise time of the differential clock signals, CL and $\overline{CL}$, to be in compliance with the HDMI compliance testing standard. In the test setup of FIG. 1, the bias-tees 18 are powered by a DC output from a data timing generator 22, such as a Data Timing Generator DTG5334, manufactured and sold by Tektronix, Inc., Beaverton Oreg. The arbitrary waveform generator 14 has two digital marker outputs, M1 and M2, which are used for synchronization, with the M1 marker connected to an external clock input of the data timing generator 22 and the M2 marker coupled to a serial trigger input of the data timing generator 22. The data timing generator 22 generates differential data signals, D0, $\overline{D0}$, D1, $\overline{D1}$, D2, $\overline{D2}$, that are coupled to the adapter board 18 via TTC modules 20. As with the differential clock signal, the TTC modules 20 slow the rise time of the differential data signals D0, $\overline{D0}$, D1, $\overline{D1}$, D2, $\overline{D2}$ to be in compliance with the HDMI compliance testing standard. A DC power supply 24 couples +5V DC and ground to the adapter board 18. The differential clock and data signals are coupled to the DUT 12 via a cable emulator 26. The cable emulator 26, such as the E4887A-101 and E4887A-102 Cable Emulators sold by Agilent Technologies, Santa Clara, Calif., emulates the characteristics of worst-case but compliant cable. The signals applied to the DUT 12 can be monitored using a measurement test instrument 28, such as a digital oscilloscope, to verify compliance with a particular HTMI standard.

SUMMARY OF THE INVENTION

The apparatus and method for varying inter symbol interference and bandwidth extension pre-emphasis on a high speed digital signal may be implemented as a signal generating device having a display and a central processing unit. The central processing unit generates a user interface on the display for setting parameters for a serial data pattern and a parameter for an intersymbol interference effect and bandwidth extension pre-emphasis effect on the serial data pattern. A waveform record file is generated using the serial data pattern parameters and the intersymbol interference and bandwidth extension pre-emphasis effect parameter. A waveform generation circuit receives the waveform record file and generates a serial data pattern analog output signal having the intersymbol interference effects or the bandwidth extension pre-emphasis effects defined by the intersymbol interference and bandwidth extension pre-emphasis effect parameter.

An external display may be coupled to the signal generating device as well as an external controller. The external controller generates the user interface on an external display for setting parameters for the serial data pattern and a parameter for an intersymbol interference effect and bandwidth extension pre-emphasis effect on the serial data pattern. The external controller generates the waveform record file using the serial data pattern parameters and the intersymbol interference and the bandwidth extension pre-emphasis effect parameter for use by the waveform generation circuit.

The signal generator has a step response filter responsive to the intersymbol interference effect and bandwidth extension pre-emphasis effect parameter for applying the intersymbol interference effect or the bandwidth extension pre-emphasis effect on the serial data pattern. The step response filter takes the form of:

$$\text{Step\_response} = \frac{i + \log_{10}(\alpha)}{i+1}$$

where Ω=intersymbol interference and bandwidth extension pre-emphasis controlling parameter, len=number of Intersymbol Interference Filter or Bandwidth Extension Pre-Emphasis Filter coefficients, $i=2^{\Omega}$, $$t = \frac{10 - \frac{1}{10^i}}{len}, \quad \alpha = \frac{1}{10^i}$$

to 10 in steps of t. The step response filter is converted to an impulse response Intersymbol Interference Filter for increasing intersymbol interference using an equation in the following form:

$$\text{ISI\_M} = \frac{d}{dt}\text{Step\_response}$$

where ISI_M=filter coefficients of the impulse response Intersymbol Interference Filter. An Impairment Filter having filter coefficients is convolved with filter coefficients of the impulse response Intersymbol Interference Filter to produce an impulse response Resultant Intersymbol Interference Filter.

The step response filter may also be converted to an impulse response Bandwidth Extension Pre-Emphasis Filter for increasing bandwidth extension pre-emphasis using an equation in the following form:

$$\text{Step\_response} = 2 - (\text{Step\_response}(2:\text{end}))$$

$$BWE = \frac{d}{dt}\text{Step\_response}$$

where BWE=filter coefficients of the impulse response Bandwidth Extension Pre-Emphasis Filter. An Impairment Filter having filter coefficients is convolved with filter coefficients of the impulse response Bandwidth Extension Pre-Emphasis Filter to produce an impulse response Resultant Bandwidth Extension Pre-Emphasis Filter.

A method of generating intersymbol interference effects and bandwidth extension pre-emphasis effects on a serial data pattern has the steps of generating filter coefficients of an Intersymbol Interference Filter or a Bandwidth Extension Pre-Emphasis Filter that are controlled by an intersymbol interference and bandwidth extension pre-emphasis parameter. Filter coefficients of an Impairment Filter are provided and convolved with the filter coefficients from the Intersymbol Interference Filter or the Bandwidth Extension Pre-Emphasis Filter to generate respective filter coefficients of a Resultant Intersymbol Interference Filter and Resultant Bandwidth Extension Pre-Emphasis Filter. The Impairment Filter coefficients may be in the frequency domain, which need to be converting to the time domain for convolving with the filter coefficients from the Intersymbol Interference Filter or the Bandwidth Extension Pre-Emphasis Filter. A waveform record file of serial pattern data is generated and modified by the filter coefficients of one of the Intersymbol Interference Filter, Bandwidth Extension Pre-Emphasis Filter, Resultant Intersymbol Interference Filter and Resultant Bandwidth Extension Pre-Emphasis Filter. A serial data pattern analog signal is generated from the waveform record file having one of intersymbol interference effects and bandwidth extension pre-emphasis effects defined by one of the respective Intersymbol Interference Filter, Bandwidth Extension Pre-Emphasis Filter, Resultant Intersymbol Interference Filter and Resultant Bandwidth Extension Pre-Emphasis Filter.

The filter coefficients generating step has the further steps of generating filter coefficients of a step response filter controlled by the intersymbol interference and bandwidth extension pre-emphasis effect parameter, and generating filter coefficients of an impulse response Intersymbol Interference Filter or an impulse response Bandwidth Extension Pre-Emphasis Filter from the filter coefficients of the step response filter. The coefficients of the step response are computed using an equation of the following form:

$$\text{Step\_response} = \frac{i + \log_{10}(\alpha)}{i+1}$$

where Ω=intersymbol interference and bandwidth extension pre-emphasis controlling parameter, len=number of Intersymbol Interference Filter coefficients and Bandwidth Extension Pre-Emphasis Filter coefficients, $i=2^{\Omega}$, $$t = \frac{10 - \frac{1}{10^i}}{len}, \quad \alpha = \frac{1}{10^i}$$

to 10 in steps of t.

The impulse response filter generating step has the alternative steps of computing increasing intersymbol interference using an equation in the following form:

$$\text{ISI\_M} = \frac{d}{dt}\text{Step\_response}$$

where ISI_M=filter coefficients of the impulse response Intersymbol Interference Filter, and computing increasing bandwidth extension pre-emphasis using an equation in the following form:

$$\text{Step\_response} = 2 - (\text{Step\_response}(2:\text{end}))$$

$$BWE = \frac{d}{dt}\text{Step\_response}$$

where BWE=filter coefficients of the impulse response Bandwidth Extension Pre-Emphasis Filter.

The objects, advantages and novel features of the present invention are apparent from the following detailed description when read in conjunction with appended claims and attached drawings.

BRIEF DESCRIPTION OF THE DRAWINGS

FIG. 7 is a representation of a TRANSMITTER pop-up window for implementing an apparatus and method for varying intersymbol interference and bandwidth extension pre-emphasis on a high speed digital signal according to the present invention.

DESCRIPTION OF THE INVENTION

Figure 1:
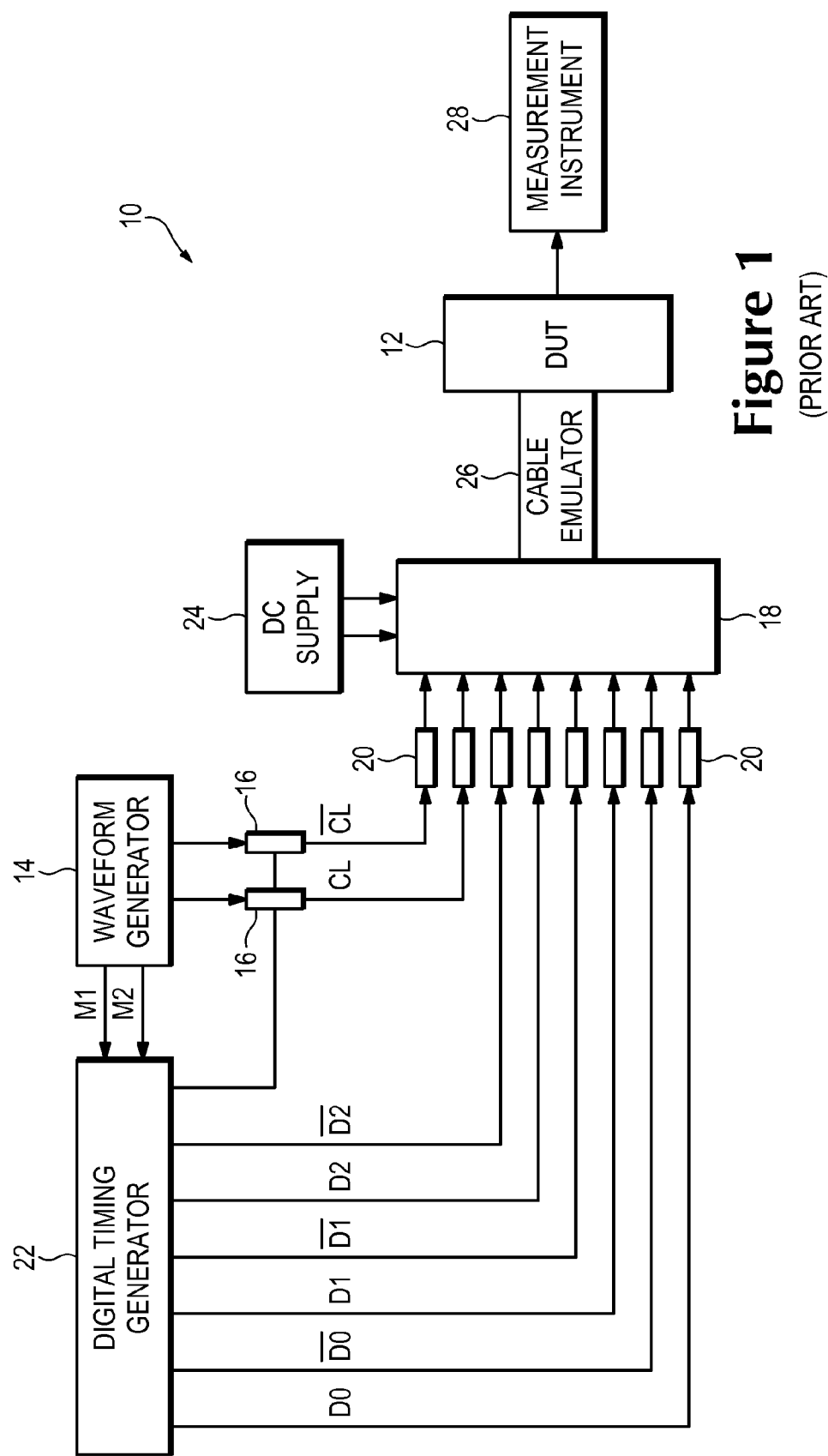
FIG. 1 shows a representative prior art test setup for HDMI compliance testing of a device under test.
Figure 2:
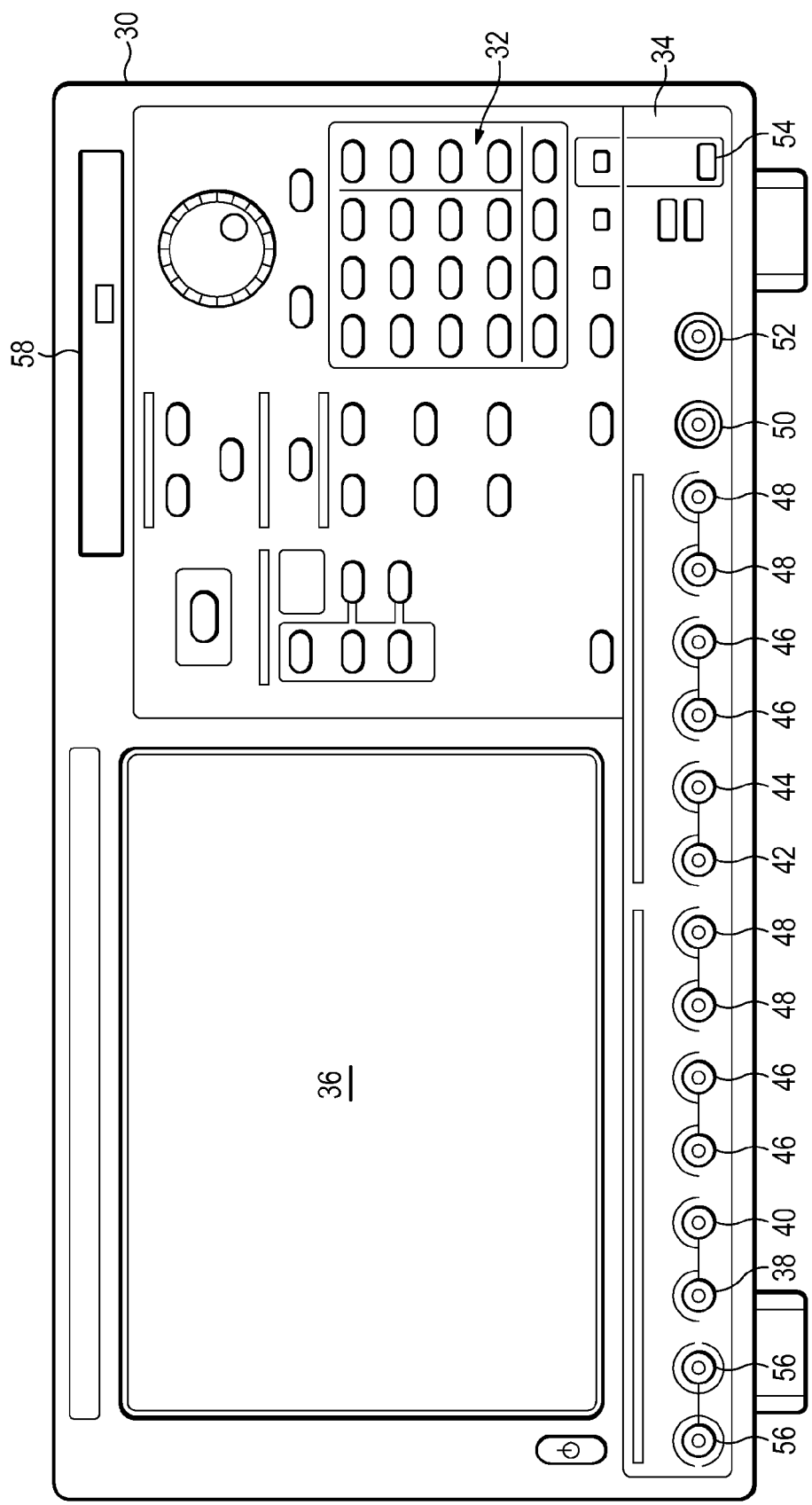
FIG. 2 shows a representative signal generator for implementing an apparatus and method for varying intersymbol interference and bandwidth extension pre-emphasis on a high speed digital signal according to the present invention.

Referring to FIG. 2, there is shown a signal generator 30, such as the AWG7102B, manufactured and sold by Tektronix, Inc. Beaverton, Oreg. The signal generator 30 generates signal outputs defined by a user using front panel controls, such as buttons and knobs 32 on the front panel 34 of the signal generator 30, in conjunction with a user interface displayed on a display device 36, such as a liquid crystal display, cathode ray tube or the like. The signal generator 30 has CHANNEL 1 signal output connectors 38 and 40 and CHANNEL 2 signal output connectors 42 and 44 with each signal channel having associated M1 and M2 marker output connectors 46 and 48. The signal generator also has a trigger input connector 50, an event input connector 52, a DC voltage out connector 54 and interleaved signal output connectors 56. The signal generator 30 further has a CD or CD/DVD drive 58 for storing waveform data, executable programs and the like.

Figure 3:
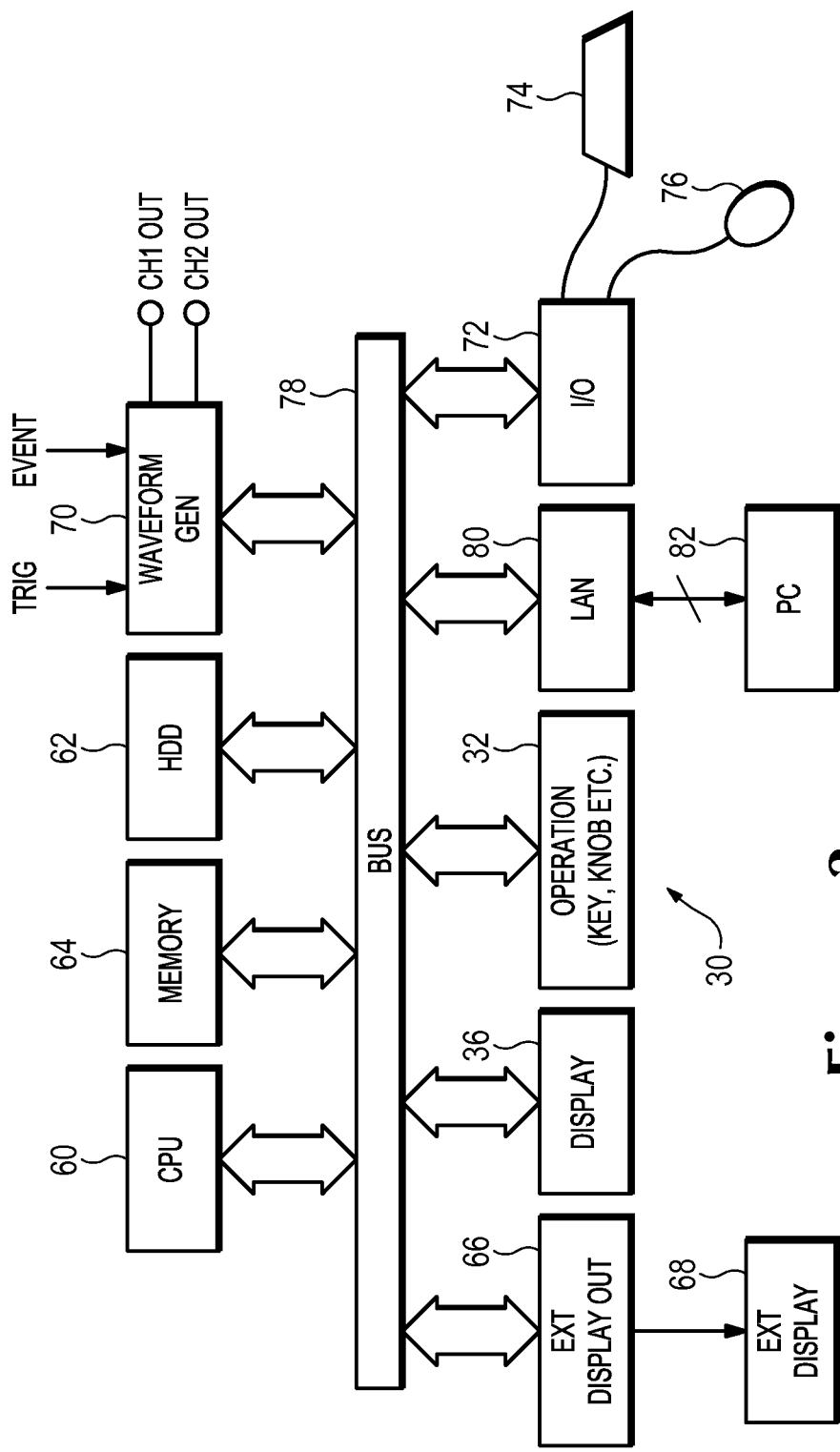
FIG. 3 is a representative block diagram of a signal generator for implementing an apparatus and method for varying intersymbol interference and bandwidth extension pre-emphasis on a high speed digital signal according to the present invention.

With reference to FIG. 3, there is shown a representative block diagram of the AWG7102B signal generator 30. The signal generator 30 has a central processing unit (CPU) 60 that controls the operation of the instrument according to programs stored on a hard disk drive (HDD) 62. A memory 64, such as RAM memory, is used for a work area for the CPU 60 for programs read from the storage device 62. A user can set up the signal generator via the button, knobs and the like 32 on the front panel 34 of the instrument. The display device 36 provides the user interface for visualizing the information relating to signal patterns and user settings. An external display output circuit 66 provides a video output which may be connected to an external display 68 for providing a larger display area in addition to the built-in display 36 of the signal generator. A waveform generation circuit 70 generates signal patterns based on user defined parameters. In this example, the waveform generator circuit has two channel outputs and inputs for trigger and event signals. An input/output port 72 is used for connecting an external keyboard 74, a pointing device, such as a mouse 76, and the like to the signal generator. The external keyboard 74 and/or mouse 76 may be included as part of the front panel controls of the signal generator. The blocks are coupled together via a signal and data bus 78. The bus 78 of the signal generator may have a Local Area Network (LAN) interface 80 for connecting the signal generator to an external controller, such as a personal computer (PC) 82. The LAN interface 80 allows the user interface to operate on the PC 82 as well as enabling the PC 82 to control the signal generator 30 over a network. Alternatively, a General Purpose Interface Bus (GPIB) interface may be used for the LAN interface 80.

Figure 4:
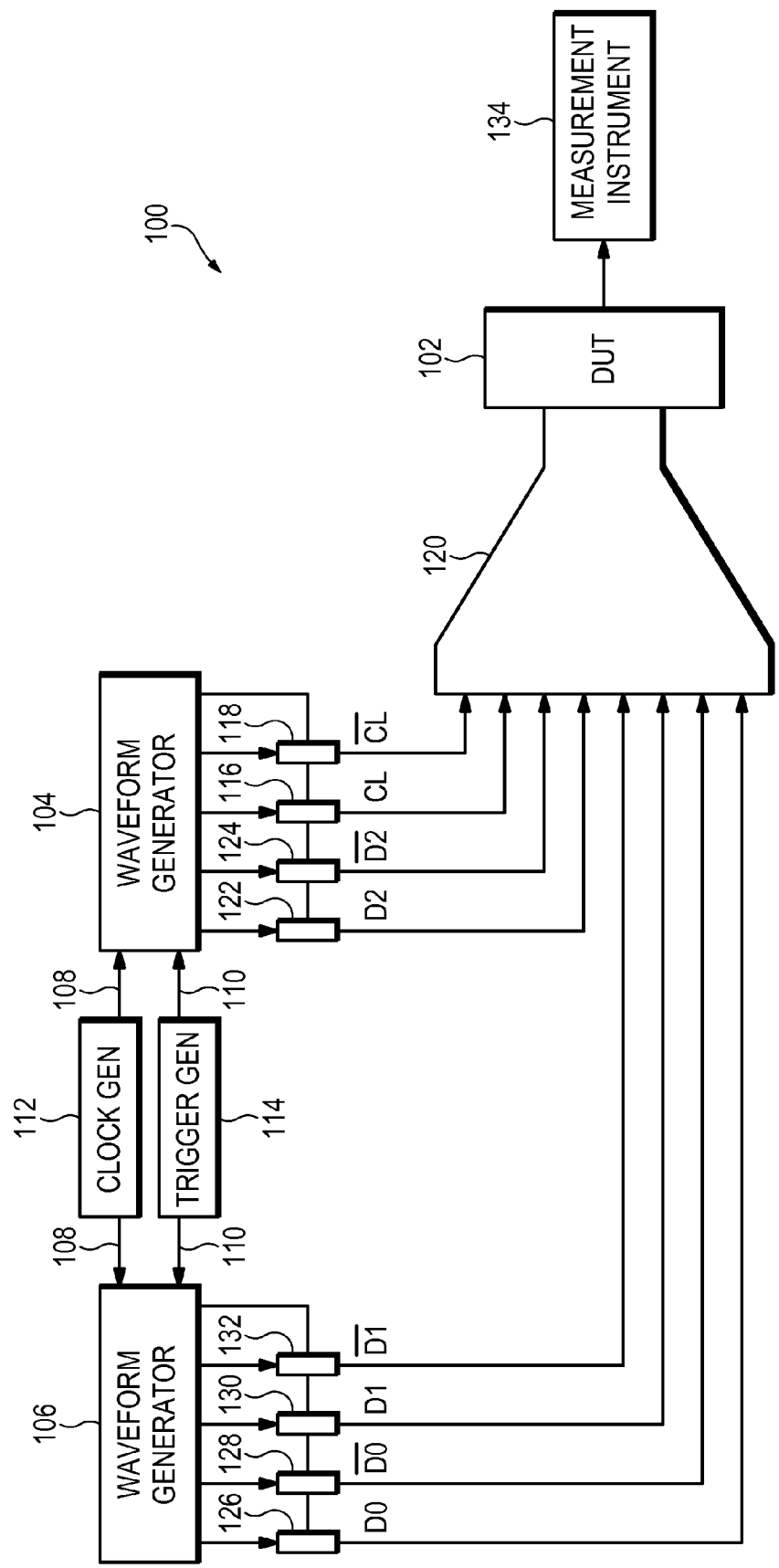
FIG. 4 shows a test setup for HDMI compliance testing of a device under test using an apparatus and method for varying intersymbol interference and bandwidth extension pre-emphasis on a high speed digital signal according to the present invention.

FIG. 4 is a representative test setup 100 for HDMI compliance testing of a device under test (DUT) 102 incorporating the apparatus and method for varying inter symbol interference and bandwidth extension pre-emphasis on a high speed digital signal according to the present invention. The test setup uses two arbitrary waveform generators (AWG) 104, 106, such as the AWG7102 Arbitrary Waveform Generator, manufactured and sold by Tektronix, Inc., Beaverton Oreg. Each AWG 104, 106 is coupled to receive a clock signal 108 and a trigger signal 110 from respective clock and trigger generators 112 and 114. In the preferred embodiment, the clock and trigger generators 112, and 114 are provided by an arbitrary function generator, such as the AFG3102, manufactured and sold by Tektronix, Inc., Beaverton Oreg. The clock signal 108 is coupled to respective clock inputs and the trigger signal 110 is coupled to the respective trigger input connectors 50 of the AWGs 104 and 106 to synchronize the operation and signal outputs of the AWGs 104 and 106. The AWG 104 generates a differential pair of clock signals, CL and $\overline{CL}$, that are coupled through respective bias tees 116, 118 to an adapter board 120, such as an ET-HDMI-TPA-S Adapter Board, Manufactured and sold by Efficere Technologies, Washougal, Wash. The bias-tees 116, 118 are required to bring the differential clock signals, CL and $\overline{CL}$, to the required TMDS (Transitioned-Minimized Differential Signaling) levels. The AWG 104 also generates differential data signals, D2, $\overline{D2}$, that are coupled to the adapter board 120 through respective bias tees 122, 124. The AWG 106 generates differential data signals, D0, $\overline{D0}$, D1, $\overline{D1}$, that are coupled through respective bias tees 126, 128, 130, 132 to the adapter board 120. The adapter board 120 is coupled to the DUT 102. The output of the DUT 102 is coupled to a measurement instrument, such as a DPO70000 Series Digital Phosphor Oscilloscopes or DSA8200 Series Digital Signal Analyzers, manufactured and sold by Tektronix, Inc, Beaverton, Oreg., for compliance testing analysis. The above described HDMI compliance testing setup incorporates a variable ISI or bandwidth extension pre-emphasis generating algorithm that is used in combination with Impairment Filters representing the cable emulator to replace the cable emulators used in prior HDMI compliance testing setups.

Figure 5:
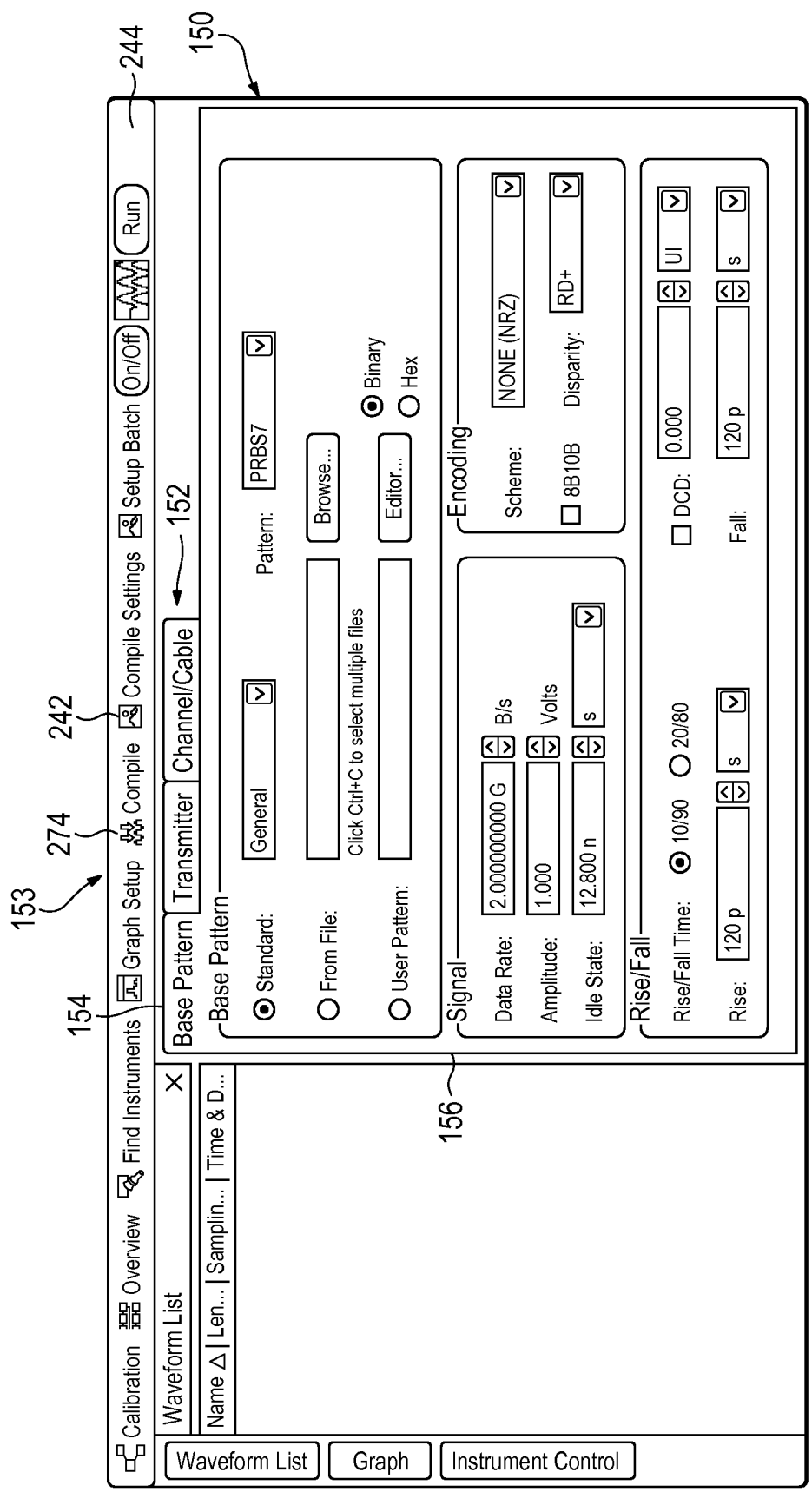
FIG. 5 is an initial user interface for implementing an apparatus and method for varying intersymbol interference and bandwidth extension pre-emphasis on a high speed digital signal according to the present invention.

Referring to FIG. 5, there is shown representative initial user interface 150 for setting parameters of a serial data pattern that is modified by an intersymbol interference effect and the bandwidth extension pre-emphasis effect parameter. The initial user interface 150 and subsequent user interfaces operate under program control of the CPU 60 with the user interface programs stored on the storage device 62. The user interfaces may be displayed on the display device 36 or on the external display 68. Alternately, the user interface programs may be stored and accessed by the PC 82 with the PC 82 processing the parameters and generating an output file that is coupled to the signal generator 30. The programs controlling the various interfaces on the signal generator 30 may be accessed via an icon on the display device 36 or by clicking on a start tab and clicking the appropriate program from a list of programs stored in the signal generator 30. The initial interface 150 includes a number of pop-up windows that are activated by clicking on various tabs 152 or buttons 153 in the initial user interface 150. The initial user interface 150 has a BASE PATTERN tab 154 that activates a BASE PATTERN pop-up window 156. The BASE PATTERN pop-up window 156 is automatically activated with the initial user interface 150.

Figure 6:
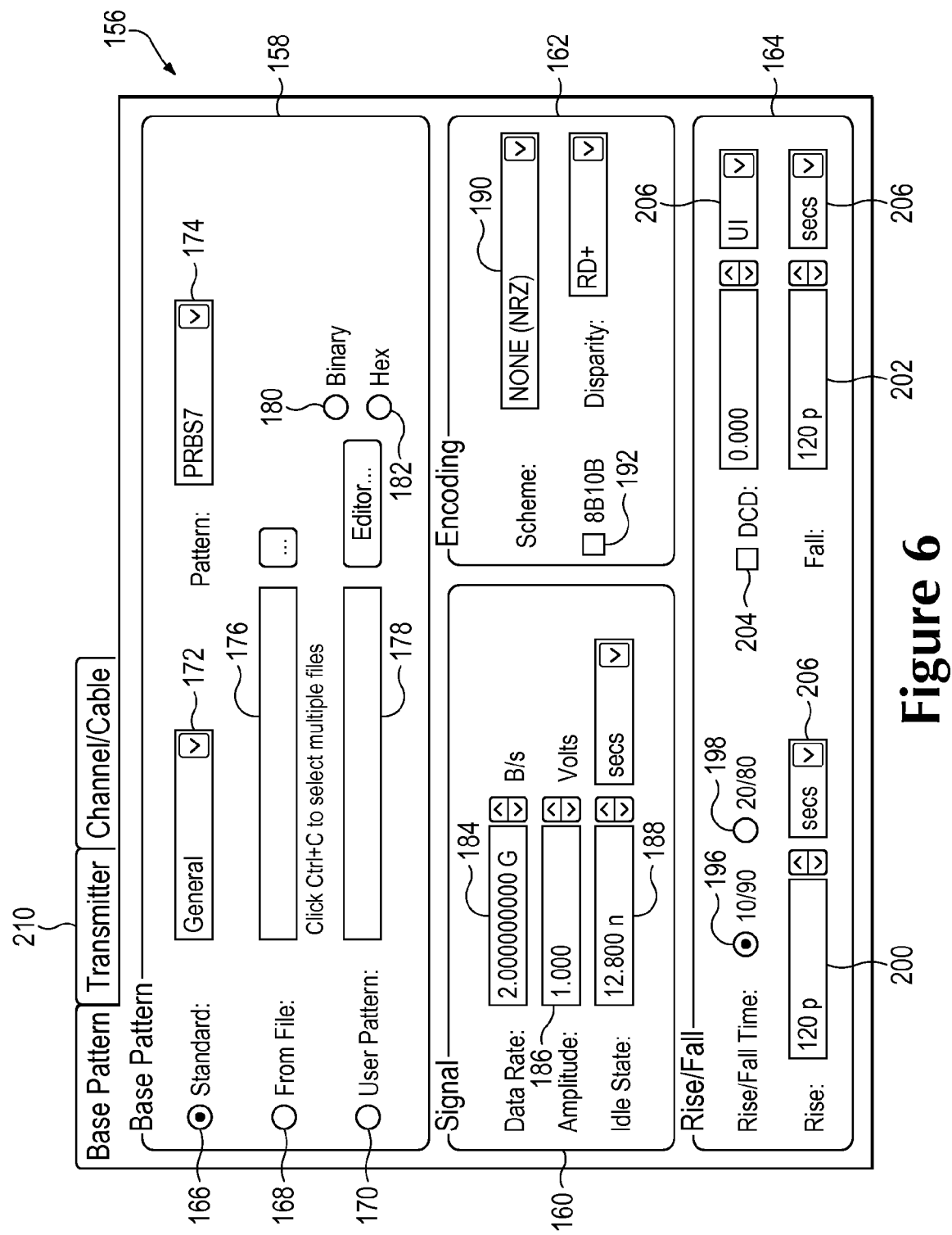
FIG. 6 is a representation of a BASE PATTERN pop-up window for implementing an apparatus and method for varying intersymbol interference and bandwidth extension pre-emphasis on a high speed digital signal according to the present invention.

FIG. 6 is a more detailed representation of the BASE PATTERN pop-up window 156 showing four defined regions of the BASE PATTERN pop-up window 156: BASE PATTERN 158, SIGNAL 160, ENCODING 162 and RISE/FALL 164. The BASE PATTERN region 158 has buttons 166, 168 and 170 that allows a user to select a serial data pattern on which the ISI or bandwidth extension pre-emphasis effects are generated. Clicking on the STANDARD button 166 activates a STANDARD box 172 and a PATTERN box 174. Click on the STANDARD box 172 displays a general serial data pattern and various serial data standards requiring compliance testing. Once a particular serial data standard is selected, clicking on the PATTERN box 174 displays various waveform patterns defined by the selected serial data standard, such as PRBS7. Clicking on the FROM FILE button 168 highlights a FILE box 176 in which a user can enter a previously stored data file. Clicking on the USER PATTERN button 170 highlights a Pattern Box 178 in which a user may enter a serial data pattern. The pattern may be entered as "0" and "1" binary data or hexadecimal data by clicking on appropriate BINARY or HEX buttons 180, 182.

The SIGNAL region 160 has a DATA RATE box 184, an AMPLITUDE box 186, and an IDLE STATE box 188. Clicking on the DATA RATE box 184 allows a user to set the data rate of the serial data. The data rate may be adjusted from 10 Mega Bits per second to 20 Giga bits per second. When the STANDARD button 166 is activated, the data rate is automatically selected as a function of the selected serial data standard. Clicking on the AMPLITUDE box 186 allows the user to select the voltage level of the serial data pattern. The user may vary the voltage level from 250 mV to 1V. The IDLE STATE box 188 is active when SATA is selected in the STANDARD box 172 and Idle Pattern is selected in the PATTERN box 174. The Idle State may be viewed as selectable periods of DC within the Idle State pattern.

The ENCODING region 162 has an ENCODING SCHEME box 190 that allows the user to set the type of coding scheme for the serial data pattern. A user may select from NRZ or NONE NRZ. Clicking on the 8B10B box 192 activates an algorithm for the mapping of 8-bit symbols to 10-bit symbols to achieve DC-balance and bounded disparity. The RISE/FALL region 164 has RISE/FALL TIME buttons 196 and 198 for respectively selecting 10/90 or 20/80 percent rise and fall time. A RISE box 200 allows the user to select the rise time of the serial data pattern leading edges. A FALL box 202 allows the user to set the fall time of the serial data pattern trailing edges. The DCD box 204 allows the user to vary the amount of Duty Cycle Distortion in the serial data pattern. The rise, fall and DCD times may be defined in seconds or unit intervals using the respective SETTING boxes 206.

Figure 7:
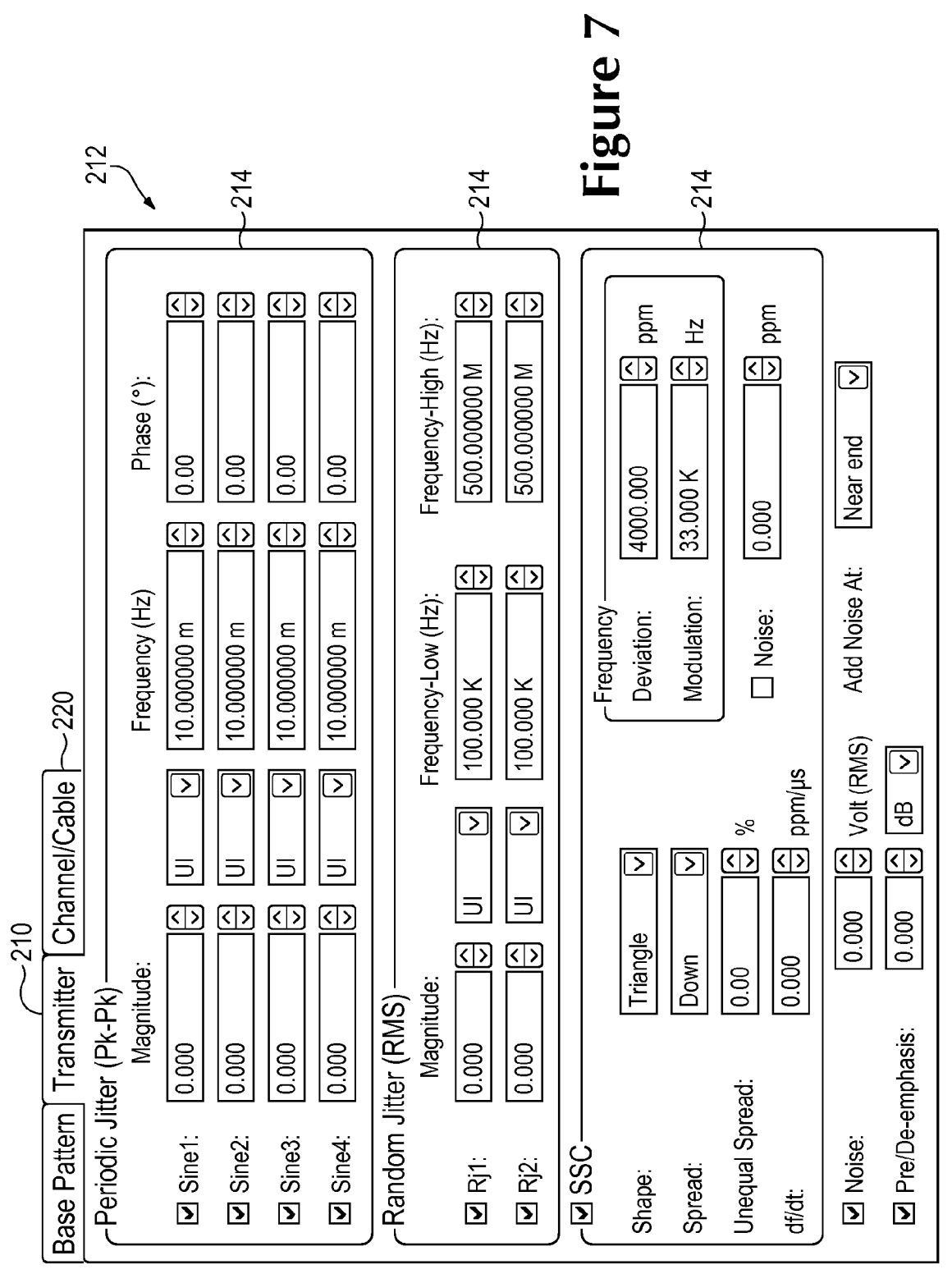

Clicking on the TRANSMITTER tab 210 activates a TRANSMITTER pop-up window 212 as shown in FIG. 7. The TRANSMITTER pop-up window 212 has boxes 214 that allow the user to set parameters for variable amounts of peak-to-peak Periodic Jitter and RMS Random Jitter, set Spread Spectrum Clock (SSC) parameters, Noise parameters in Volts (RMS) and Pre/De-emphasis parameters in dB or volts. The user has the option of placing the noise at the near end or the far end of the serial data pattern.

Figure 8:
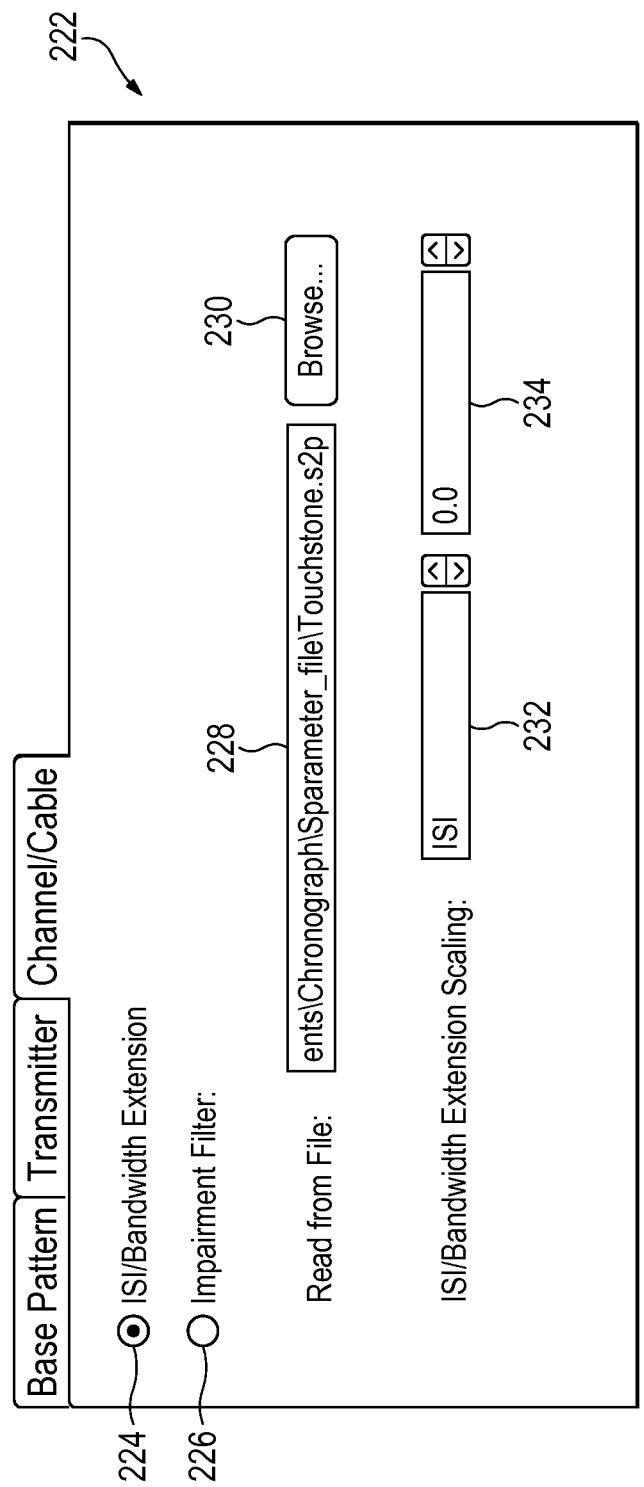
FIG. 8 is a representation of a CHANNEL/CABLE pop-up window for implementing an apparatus and method for varying intersymbol interference and bandwidth extension pre-emphasis on a high speed digital signal according to the present invention.

Clicking on the CHANNEL/CABLE tab 220 activates a CHANNEL/CABLE pop-up window 222 as shown in FIG. 8. The user may activate ISI/BANDWIDTH EXTENSION by clicking on an ISI/BANDWIDTH EXTENSION button 224. The user may also clicks on an IMPAIRMENT FILTER button 226 to activate a filter box and browse button. A READ FROM FILE box 228 and associated BROWSE button 230 allows the user to select a previously stored impairment filter file. An ISI/BANDWIDTH EXTENSION box 232 allows a user to select between adding ISI or Bandwidth Extension to the waveform record or add ISI or Bandwidth Extension to a selected Impairment Filter. An ISI/BANDWIDTH EXTENSION SCALING box 234 allows the user to set the intersymbol interference effect and the bandwidth extension pre-emphasis effect parameter which in the preferred embodiment is varied from −8 to +8. Generally, impairment filter files are stored as S-Parameters files defining filter coefficients in the frequency domain. Alternately, the impairment filter files may define time domain impulse response or step response filter coefficients.

Figure 9:
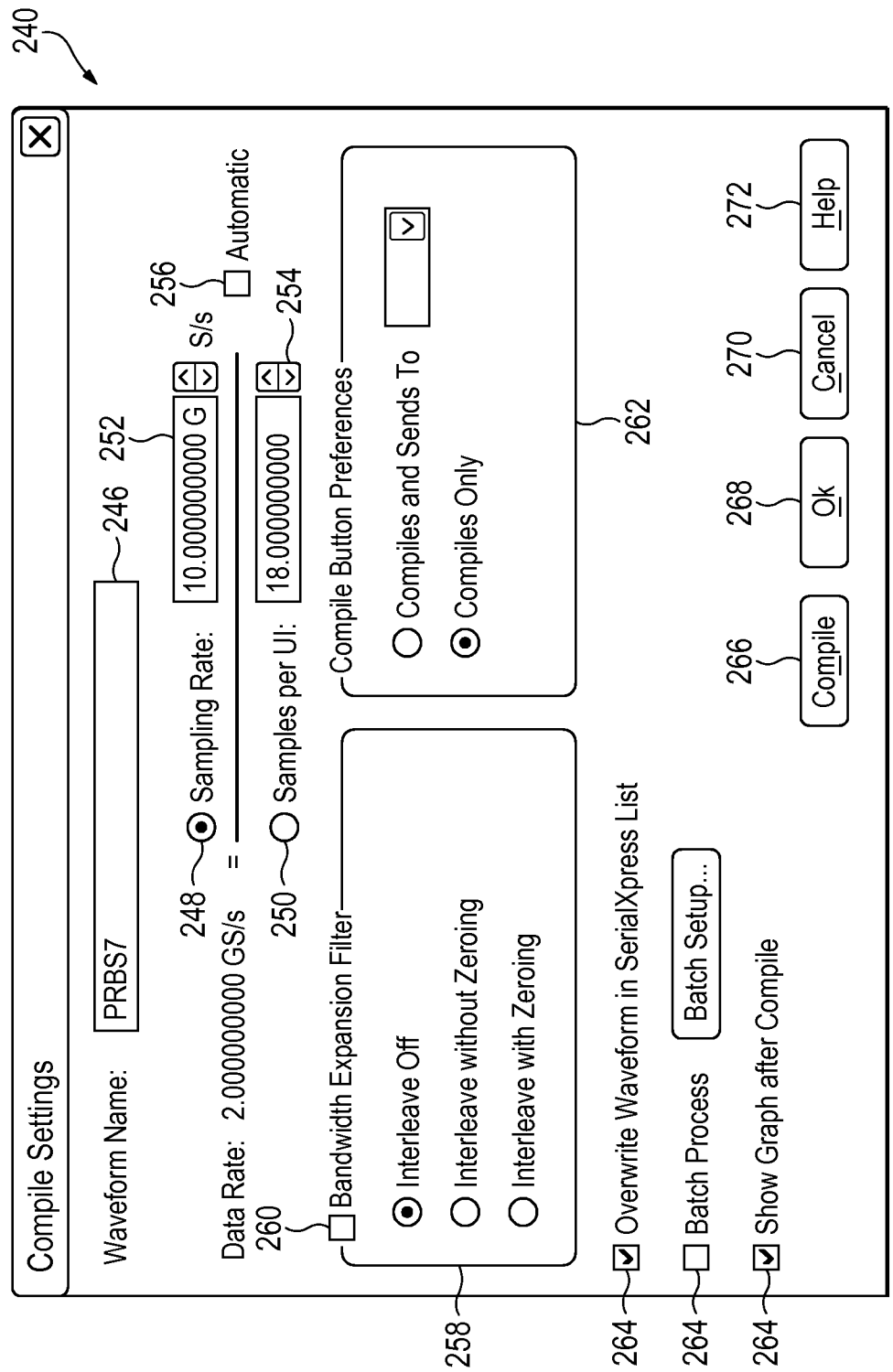
FIG. 9 is a representation of a COMPILE SETTINGS pop-up window for implementing an apparatus and method for varying intersymbol interference and bandwidth extension pre-emphasis on a high speed digital signal according to the present invention.

Referring back to FIG. 5, once the user has set the parameters for the serial data pattern and selected the amount of ISI or Bandwidth Extension Pre-emphasis to be applied to the serial data pattern, the user activates a COMPILE SETTINGS pop-up window 240, shown in. FIG. 9, by clicking on a COMPILE SETTINGS button 242 on the initial user interface 150 tool bar 244. The COMPILE SETTINGS pop-up window 240 has a WAVEFORM NAME box 246 for providing a user defined name for a waveform file generated by the signal generator 30 using the user defined serial data pattern parameters and intersymbol interference effect and the bandwidth extension pre-emphasis effect parameter for the serial data pattern. The data rate for the serial data pattern entered using the BASE PATTERN pop-up window 156 is displayed next to "Data Rate". The user can click on a SAMPLE RATE button 248 or a SAMPLES PER UI button 250 to activate respective SAMPLE RATE or SAMPLES PER UI boxes 252, 254. The user may manually set the sampling rate or samples per UI by entering appropriate values based on the serial data pattern and the data rate. The sampling rate or samples per UI may be automatically set based on the data rate and the serial data pattern by clicking on AUTOMATIC box 256. A BANDWIDTH EXPANSION FILTER region 258 may be activated by clicking on a BANDWIDTH EXPANSION FILTER button 260. The BANDWIDTH EXPANSION FILTER region 258 allows a user to select or turn off various interleaving parameters. A COMPILE BUTTON PREFERENCES region 262 allows the user to select either COMPILE ONLY or COMPILE AND SENT TO parameters for the compiled waveform record defined by the serial data pattern parameters and the ISI/Bandwidth Extension parameter. Toward the bottom of the COMPILE SETTINGS pop-up window 240 are additional parameters that may be set by clicking on the appropriate boxes 264. At the bottom of the COMPILE SETTINGS pop-up window 240 are COMPILE, OK, CANCEL and HELP buttons 266, 268, 270 and 272 that allows the user to select various options related to the COMPILE SETTINGS pop-up window 240. One option is to click on the COMPILE button 266 that initiates the compiling of the serial data pattern and ISI/Bandwidth Extension parameter to generate a waveform record file containing digital data for generating an analog serial data pattern from the signal generator 30. Another option is to click on the OK button 268 that saves the parameters selected in the COMPILE SETTINGS pop-up window 140 and closes the window 240. A further option is to click on the CANCEL button 270 that closes the COMPILE SETTINGS pop-up window 240 without saving the parameters selected in the window 140. Clicking on the HELP button 272 activates a HELP pop-up window from which the user may seek help.

The initial user interface 50 tool bar 204 has a COMPILE button 274 (as shown in FIG. 5) that functions in the same manner as the COMPILE button 266 (as shown in FIG. 9) in the COMPILE SETTINGS pop-up window 240 by initiating the compiling of the serial data pattern parameters and intersymbol interference effect and the bandwidth extension pre-emphasis effect parameter to generate a waveform record file containing digital data for generating an analog serial data pattern from the signal generator 30.

Figure 10A:
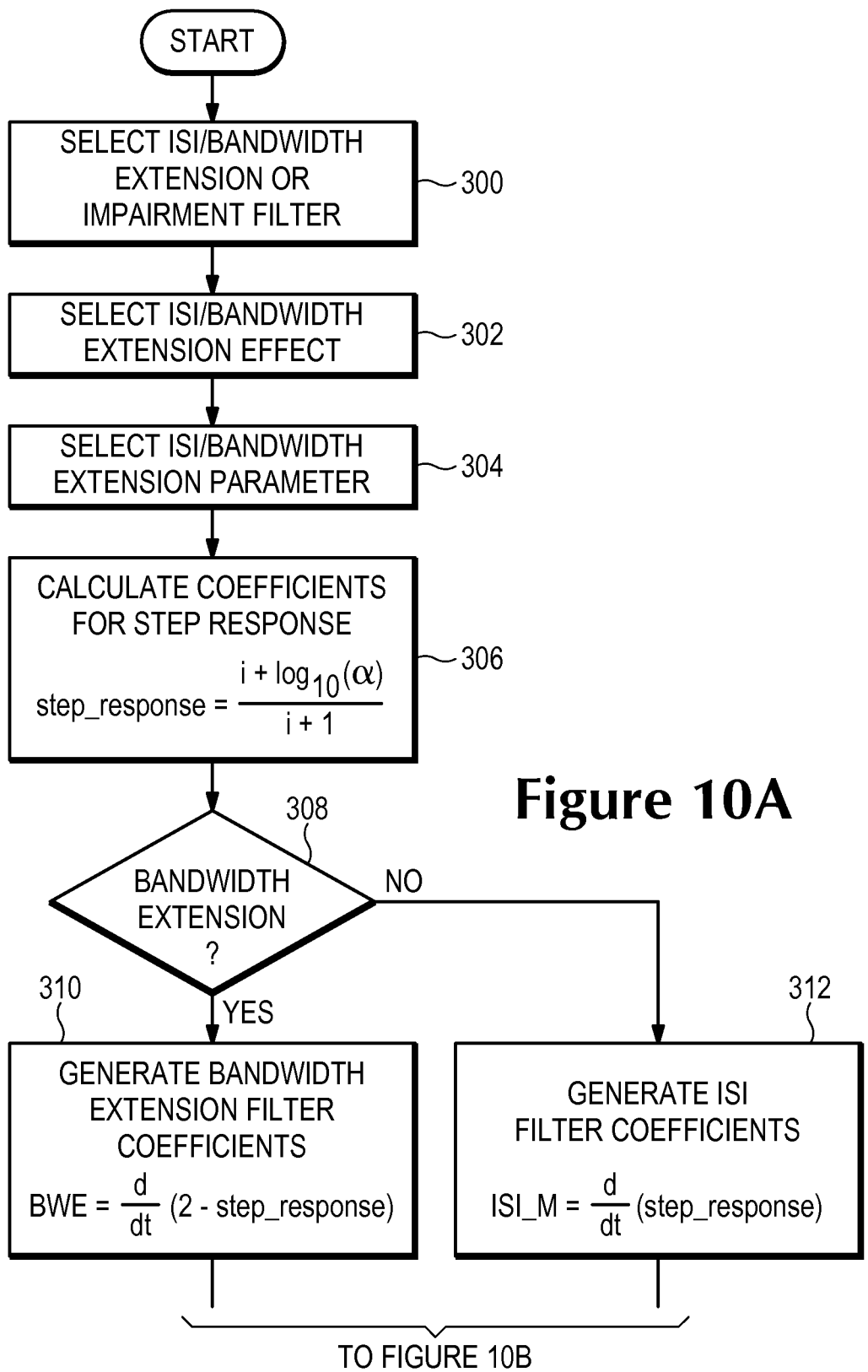
FIGS. 10A and 10B are flow charts illustrating the steps in implementing an apparatus and method for varying intersymbol interference and bandwidth extension pre-emphasis on a high speed digital signal according to the present invention.
Figure 10B:
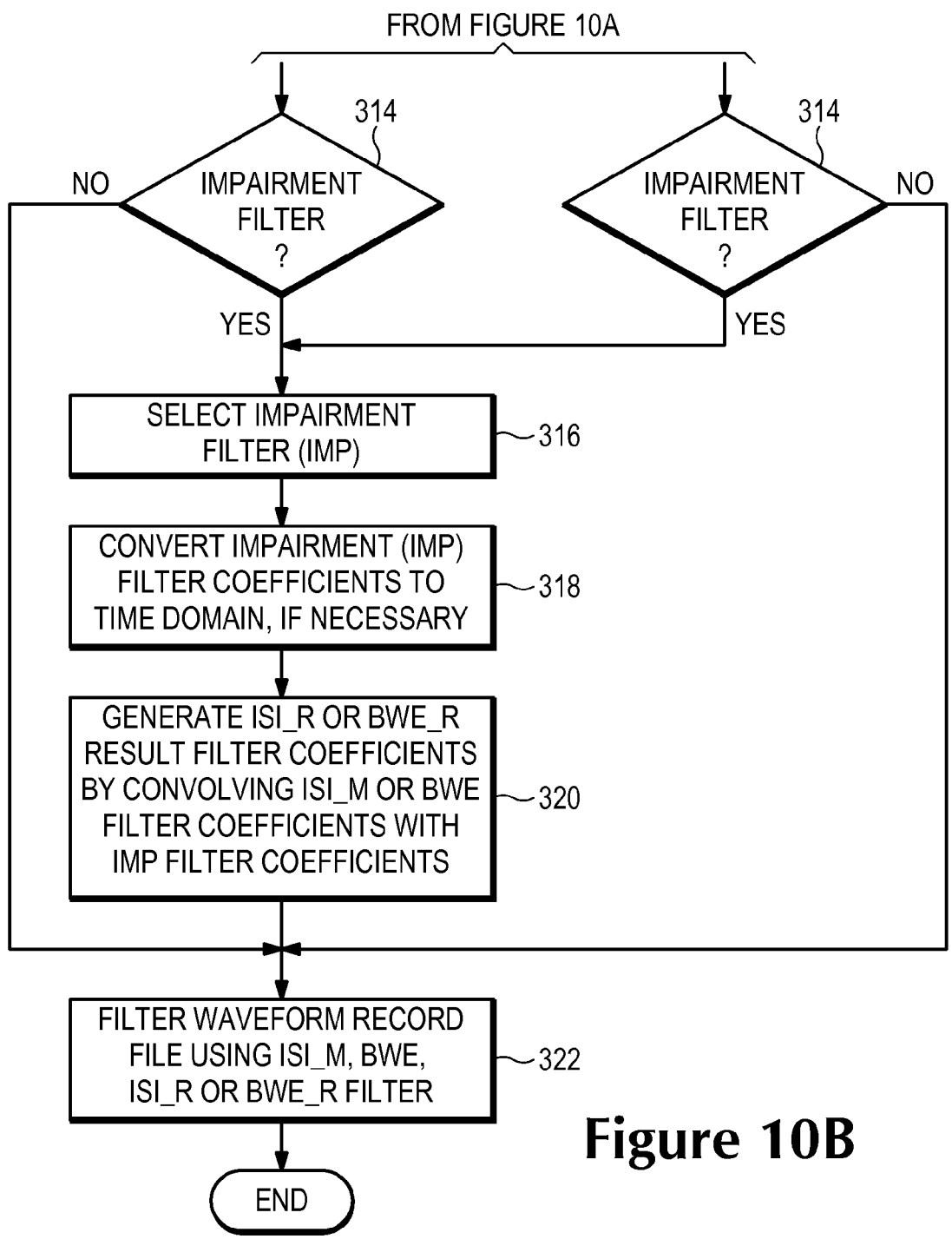

Referring to FIGS. 10A and 10B, there is shown a flow chart implementing an algorithm for adding an intersymbol interference effect or bandwidth extension pre-emphasis effect to a high speed serial data pattern. A user selects ISI/Bandwidth Extension or Impairment Filter by activating one of the ISI/BANDWIDTH EXTENSION or IMPAIRMENT FILTER buttons 224, 226 in the CHANNEL/CABLE pop-up window 222 in FIG. 8 at step 300. The user selects either an intersymbol interference effect or bandwidth extension pre-emphasis effect using the ISI/BANDWIDTH EXTENSION box 232 at step 302. The user then uses the ISI/BANDWIDTH EXTENSION SCALING box 234 to select the ISI and bandwidth extension pre-emphasis effects parameter to be applied to the high speed serial data pattern at step 304. The coefficients of a step response filter are calculated using the selected ISI and bandwidth extension pre-emphasis effects parameter and Equation 1 at step 306.

$$\text{step\_response} = \frac{i + \log_{10}(\alpha)}{i+1} \quad \text{EQ. 1}$$

where:
$\Omega$ = ISI/Bandwidth Extension parameter
len = number of ISI/Bandwidth Extension filter coefficients
t = time
l = $2^\Omega$ $$t = \frac{10 - \frac{1}{10^i}}{len}$$

$$\alpha = \frac{1}{10^i}$$

to 10 in steps of t

The value of len may be an integer multiple of the "number of samples per bit", which is defined as the sample frequency of the system divided by the data rate. For example, the sample frequency of the signal generator 30 is set at 10 GHz and the data rate of the signal to be processed is set to 2 GHz. The sample per bit is 10 GHz divided by 2 GHZ which is equal to 5. The value of len can be multiples of 5, i.e. 5/10/15/20 and so on. The more the value of len, the less is the effect of the ISI/Bandwidth Extension parameter $\Omega$ on the signal.

A determination is made at step 308 as to whether the intersymbol interference effect or the bandwidth extension pre-emphasis effect was chosen at step 302. If the user selects the bandwidth extension pre-emphasis effect, coefficients of a Bandwidth Extension Filter (BWE) are generated using Equation 2 at step 310.

$$BWE = \frac{d}{dt}(2 - \text{step\_response}) \quad \text{EQ. 2}$$

If the determination at step 308 was to the intersymbol interference effect, coefficients of an ISI Filter (ISI_M) are calculated using Equation 3 at step 312.

$$\text{ISI\_M} = \frac{d}{dt}(\text{step\_response})$$

A determination is made at step 314 as to whether the IMPAIRMENT FILTER button 226 was activated at step 300. If the Impairment Filter was selected, then the user selects an Impairment Filter (IMP) using the READ FROM FILE box 228 and BROWSE button 230 at step 316. If the Impairment Filter file has spectral domain filter coefficient, then the spectral domain filter coefficients are converted to time domain filter coefficients using an Inverse Fast Fourier Transform (IFFT) or the like at step 318. The time domain filter coefficients of the Impairment Filter (IMP) are convolved with either the filter coefficients of the ISI Filter (ISI_M) or Bandwidth Extension Filter (BWE) to generate a Resultant ISI Filter (ISI_R) or a Resultant Bandwidth Extension Pre-Emphasis Filter (BWE_R) at step 320. The waveform record file generated from the high speed serial data pattern parameters is filtered using one of the ISI Filter, the Bandwidth Extension Pre-Emphasis Filter, the Resultant ISI Filter (ISI_R), or the Resultant Bandwidth Extension Pre-Emphasis Filter (BWE_R) at step 322. The filter waveform record file is then read out by the waveform generator 70 to produce a high speed analog signal data pattern having added ISI or bandwidth extension pre-emphasis.

Figure 11:
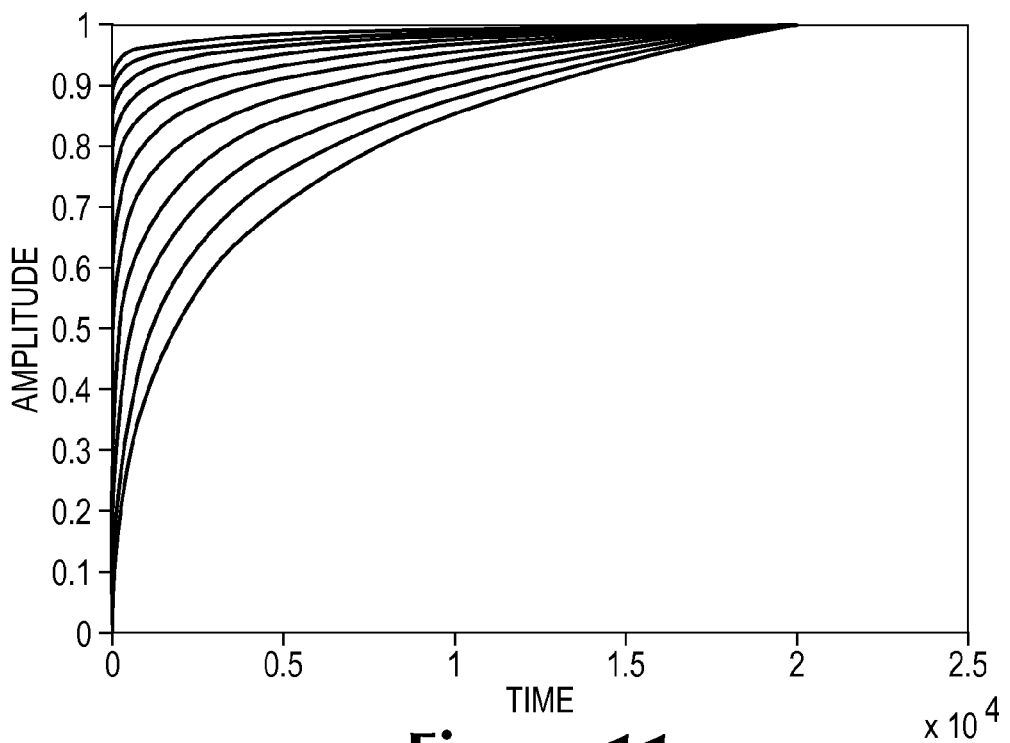
FIG. 11 is graphical plot illustrating a step response of ISI filter for various conditions of ISI effect parameter values in an apparatus and method for varying intersymbol interference and bandwidth extension pre-emphasis on a high speed digital signal according to the present invention.

FIG. 11 illustrates the step response of the ISI Filter for various conditions of the ISI effect parameter values $\Omega$. The plots correspond to an increasing ISI effect parameter value with the lowest plot lines corresponding to the lower ISI effect parameter values and the higher plot lines corresponding to the higher ISI effect parameter vales.

Figure 12:
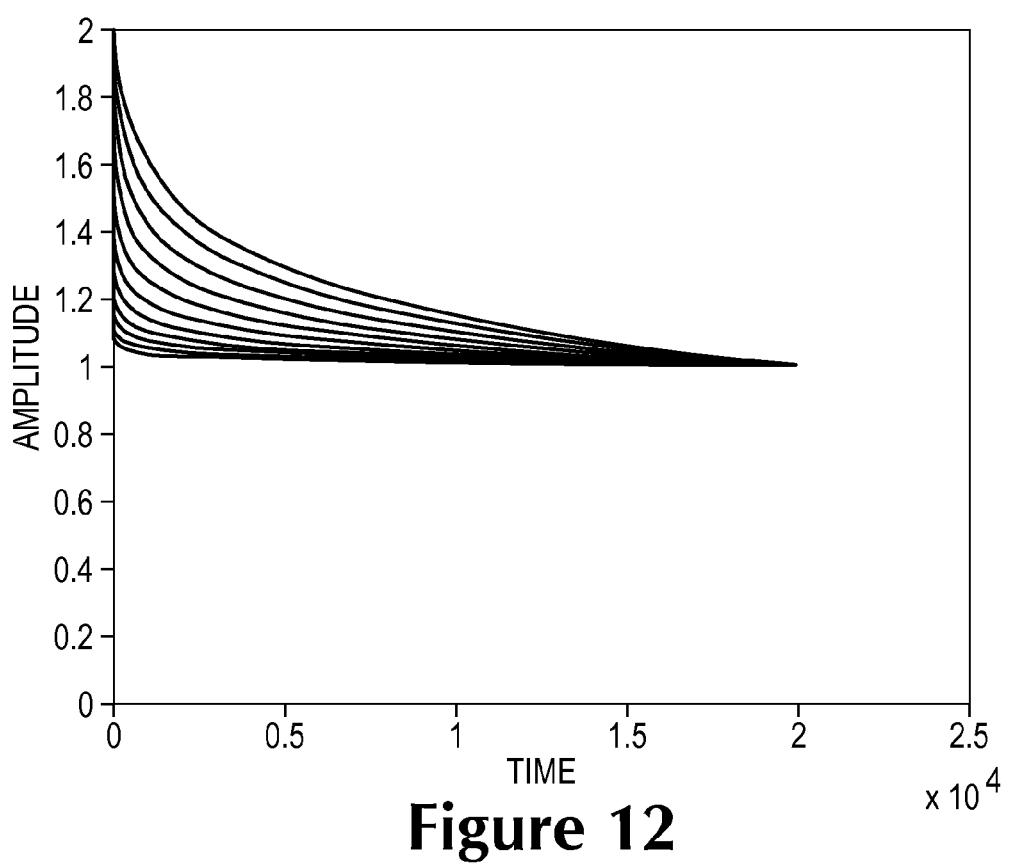
FIG. 12 is a graphical plot illustrating a step response of Bandwidth Extension Pre-Emphasis Filter for various conditions of the bandwidth extension pre-emphasis effect parameter values in an apparatus and method for varying intersymbol interference and bandwidth extension pre-emphasis on a high speed digital signal according to the present invention.

FIG. 12 illustrates the step response of Bandwidth Extension Pre-Emphasis Filter for various conditions of the bandwidth extension pre-emphasis effect parameter values Ω. The plots correspond to a decreasing bandwidth extension pre-emphasis effect parameter value with the highest plot lines corresponding to the higher bandwidth extension pre-emphasis effect parameter values and the lowest plot lines corresponding to the lower bandwidth extension pre-emphasis effect parameter vales.

It will be obvious to those having skill in the art that many changes may be made to the details of the above-described embodiments of this invention without departing from the underlying principles thereof. The scope of the present invention should, therefore, be determined only by the following claims.

What is claimed is:

1. A signal generating device comprising:
   a display;
   a central processing unit generating a user interface on the display for setting parameters for a serial data pattern and a parameter for at least one of an intersymbol interference effect and a bandwidth extension pre-emphasis effect on the serial data pattern wherein a waveform record file is generated using the serial data pattern parameters and the intersymbol interference effect and the bandwidth extension pre-emphasis effect parameter; and
   a waveform generation circuit receiving the waveform record file and generating a serial data pattern analog output signal having at least one of the intersymbol interference effect and the bandwidth extension pre-emphasis effects defined by the intersymbol interference effect and bandwidth extension pre-emphasis effect parameter.

2. The signal generating device as recited in claim 1 wherein the display comprises an external display coupled to the signal generating device.

3. The signal generating device as recited in claim 1 further comprising an external controller coupled to the signal generating device with the external controller generating the user interface on an external display for setting parameters for the serial data pattern and the parameter for at least one of intersymbol interference effect and bandwidth extension pre-emphasis effect on the serial data pattern and generating the waveform record file using the serial data pattern parameters and the intersymbol interference effect and bandwidth extension pre-emphasis effect parameter for use by the waveform generation circuit.

4. The signal generating device as recited in claim 1 further comprising a step response filter responsive to the intersymbol interference effect and bandwidth extension pre-emphasis effect parameter for applying at least one of the intersymbol interference effect and a bandwidth extension pre-emphasis effect on the serial data pattern.

5. The signal generating device as recited in claim 4 wherein the step response filter is in the form of:

$$\text{Step\_response} = \frac{i + \log_{10}(\alpha)}{i+1}$$

where Ω=intersymbol interference and bandwidth extension pre-emphasis controlling parameter, len=number of Intersymbol Interference Filter and Bandwidth Extension Pre-Emphasis Filter coefficients, $i=2^{\Omega}$, $$t = \frac{10 - \frac{1}{10^i}}{len}$$

$$\alpha = \frac{1}{10^i}$$

to 10 in steps of t.

6. The signal generating device as recited in claim 5 wherein the step response filter is converted to an impulse response Intersymbol Interference Filter for increasing intersymbol interference using an equation in the following form:

$$\text{ISI\_M} = \frac{d}{dt}\text{Step\_response}$$

where ISI_M=filter coefficients of the impulse response Intersymbol Interference Filter.

7. The signal generating device as recited in claim 6 further comprising an Impairment Filter having filter coefficients convolved with filter coefficients of the impulse response Intersymbol Interference Filter to produce an impulse response Resultant Intersymbol Interference Filter.

8. The signal generating device as recited in claim 5 wherein the step response filter is converted to an impulse response Bandwidth Extension Pre-Emphasis Filter for increasing bandwidth extension pre-emphasis using an equation in the following form:

$$\text{Step\_response} = 2 - (\text{Step\_response}(2:\text{end}))$$

$$BWE = \frac{d}{dt}\text{Step\_response}$$

where BWE=filter coefficients of the impulse response Bandwidth Extension Pre-Emphasis Filter.

9. The signal generating device as recited in claim 8 further comprising an Impairment Filter having filter coefficients convolved with filter coefficients of the impulse response Bandwidth Extension Pre-Emphasis Filter to produce an impulse response Resultant Bandwidth Extension Pre-Emphasis Filter.

10. A method of generating intersymbol interference effects and bandwidth extension pre-emphasis effects on a serial data pattern comprising the steps of:
    generating filter coefficients of one of an Intersymbol Interference Filter and Bandwidth Extension Pre-Emphasis Filter controlled by an intersymbol interference effect and bandwidth extension pre-emphasis parameter;
    providing filter coefficients of an Impairment Filter;
    convolving the filter coefficients from the Impairment Filter with the filter coefficients from one of the Intersymbol Interference Filter and Bandwidth Extension Pre-Emphasis Filter to generate respective filter coefficients of a Resultant Intersymbol Interference Filter and Resultant Bandwidth Extension Pre-Emphasis Filter;
    generating a waveform record file of serial pattern data modified by the filter coefficients of one of the Intersymbol Interference Filter, Bandwidth Extension Pre-Emphasis Filter, Resultant Intersymbol Interference Filter and Resultant Bandwidth Extension Pre-Emphasis Filter;

generating a serial data pattern analog signal from the waveform record file having one of intersymbol interference effects and bandwidth extension pre-emphasis effects defined by one of the respective Intersymbol Interference Filter, Bandwidth Extension Pre-Emphasis Filter, Resultant Intersymbol Interference Filter and Resultant Bandwidth Extension Pre-Emphasis Filter.

11. The method of generating intersymbol interference effects and bandwidth extension pre-emphasis effects on a serial data pattern as recited in claim 10 wherein the filter coefficient generating step further comprises the steps of:

generating filter coefficients of a step response filter controlled by the intersymbol interference effect and the bandwidth extension pre-emphasis effect parameter; and generating filter coefficients of one of an impulse response Intersymbol Interference Filter and an impulse response Bandwidth Extension Pre-Emphasis Filter from the filter coefficients of the step response filter.

12. The method of generating intersymbol interference effects and bandwidth extension pre-emphasis effects on a serial data pattern as recited in claim 11 wherein the step response filter coefficients generating step further comprises the steps of computing coefficients of the step response using an equation of the following form:

$$\text{Step\_response} = \frac{i + \log_{10}(\alpha)}{i+1}$$

where $\Omega$=intersymbol interference and bandwidth extension pre-emphasis controlling parameter, len=number of Intersymbol Interference Filter coefficients and Bandwidth Extension Pre-Emphasis Filter coefficients, $i=2^{\Omega}$, $$t = \frac{10 - \frac{1}{10^i}}{len}, \alpha = \frac{1}{10^i}$$

to 10 in steps of t.

13. The method of generating intersymbol interference effects and bandwidth extension pre-emphasis effects on a serial data pattern as recited in claim 12 wherein the impulse response filter generating step further comprises the step of computing increasing intersymbol interference using an equation in the following form:

$$\text{ISI\_M} = \frac{d}{dt}\text{Step\_response}$$

where ISI_M=filter coefficients of the impulse response Intersymbol Interference Filter.

14. The method of generating intersymbol interference effects and bandwidth extension pre-emphasis effects on a serial data pattern as recited in claim 12 wherein the impulse response filter generating step further comprises the step of computing increasing bandwidth extension pre-emphasis using an equation in the following form:

$$\text{Step\_response} = 2 - (\text{Step\_response}(2:\text{end}))$$

$$BWE = \frac{d}{dt}\text{Step\_response}$$

where BWE=filter coefficients of the impulse response Bandwidth Extension Pre-Emphasis Filter.

15. The method of generating intersymbol interference effects and bandwidth extension pre-emphasis effects on a serial data pattern as recited in claim 10 wherein the filter coefficients of the Impairment Filter are in the frequency domain and providing the filter coefficients of the Impairment Filter further comprises the step of converting the filter coefficients of the Impairment Filter from the frequency domain to the time domain.

* * * * *